United States Patent [19]
Church et al.

[11] Patent Number: 5,782,449
[45] Date of Patent: Jul. 21, 1998

[54] BACKPACK STOVE STAND

[76] Inventors: Thomas E. Church, 1900 Hillsdale Rd., Athol, Id. 83801; Brian R. Killian, 14353-117th Ave., N.E., Kirkland, Wash. 98034; Richard A. Milestone, 19417 SE. 128th St., Renton, Wash. 98059

[21] Appl. No.: 663,810

[22] Filed: Jun. 14, 1996

[51] Int. Cl.⁶ ........................................ A47B 91/00
[52] U.S. Cl. .................... 248/346.03; 126/38; 126/40; 248/689
[58] Field of Search .................... 248/682, 689, 248/346.03, 688, 176.1, 176.2, 174, 188.1, 154, 146; 126/38, 40, 50

[56] References Cited

U.S. PATENT DOCUMENTS

| | | |
|---|---|---|
| D. 235,959 | 7/1975 | Allander .................... D7/107 |
| 807,613 | 12/1905 | Graves . |
| 1,684,925 | 9/1928 | Perlmutter . |
| 1,782,313 | 11/1930 | Poehls . |
| 1,854,120 | 10/1932 | Mross . |
| 2,102,893 | 12/1937 | Forster . |
| 2,588,862 | 3/1952 | Mayo . |
| 2,857,905 | 10/1958 | Vanderbeek . |
| 3,080,861 | 3/1963 | Amero . |
| 3,277,880 | 10/1966 | Kirby .................... 126/40 |
| 3,877,458 | 4/1975 | Allander .................... 126/44 |
| 4,177,790 | 12/1979 | Zenzaburo .................... 126/38 |
| 4,204,516 | 5/1980 | Figura .................... 126/9 |
| 4,322,049 | 3/1982 | Holland et al. .................... 248/154 |
| 4,938,202 | 7/1990 | Hait .................... 126/9 |
| 5,307,798 | 5/1994 | Overmars, Sr. .................... 126/40 |

FOREIGN PATENT DOCUMENTS

| | | | |
|---|---|---|---|
| 51783 | 4/1890 | Germany | .................... 248/154 |

*Primary Examiner*—Ramon O. Ramirez
*Attorney, Agent, or Firm*—Dowrey & Associates

[57] ABSTRACT

A lightweight stove stand for a portable backpack stove is provided with a thin base plate constructed from a thin sheet of polycarbonate resin with anchor clips on one end for attaching a stove base and hold-down means on the other end for attaching a fuel tank to the top surface. A cut-out area is provided in the base plate beneath the stove mounting and a thin aluminum heat shield is attached to the top surface of the base plate surrounding the stove. The heat shield is attached to the base plate by pop rivets or the like which extend through the base plate and provide anti-skid protrusions on the bottom surface thereof.

19 Claims, 4 Drawing Sheets

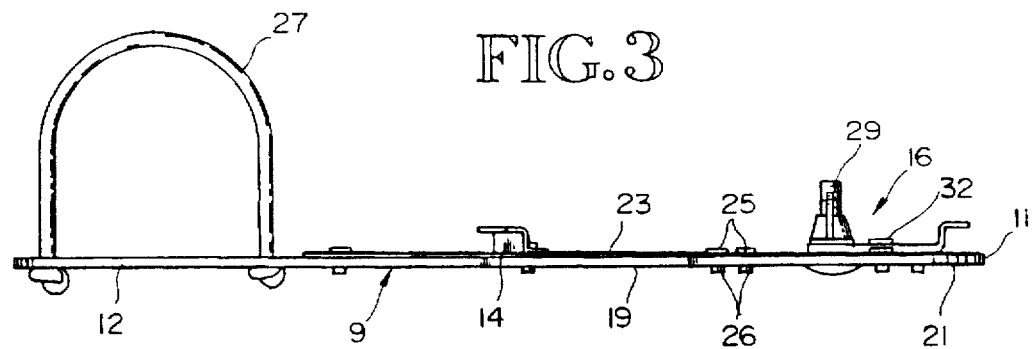
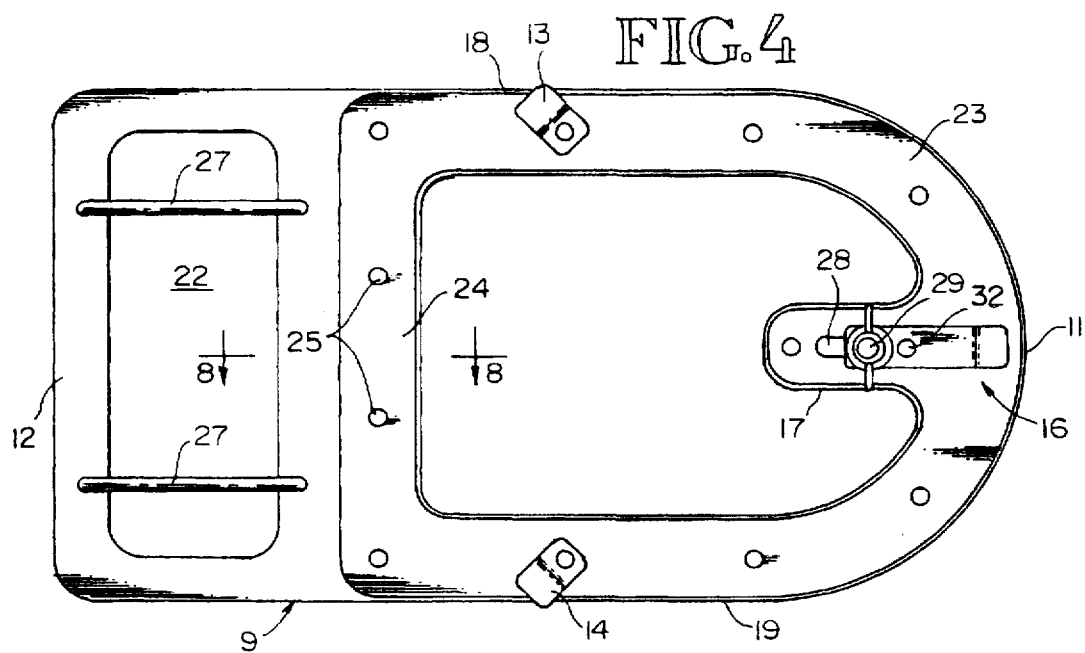
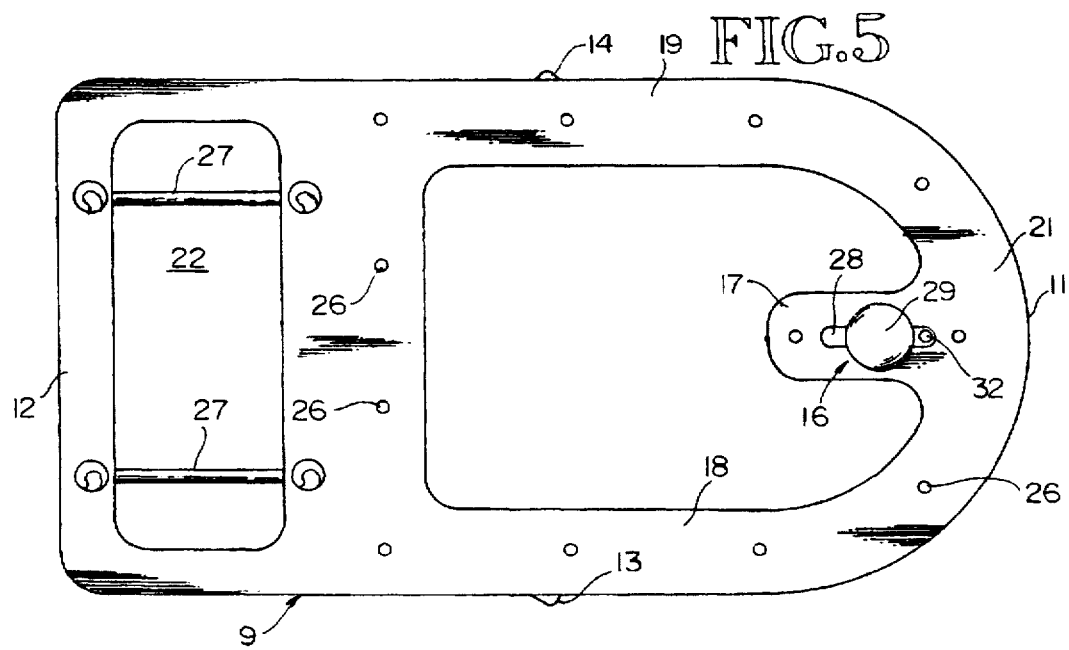

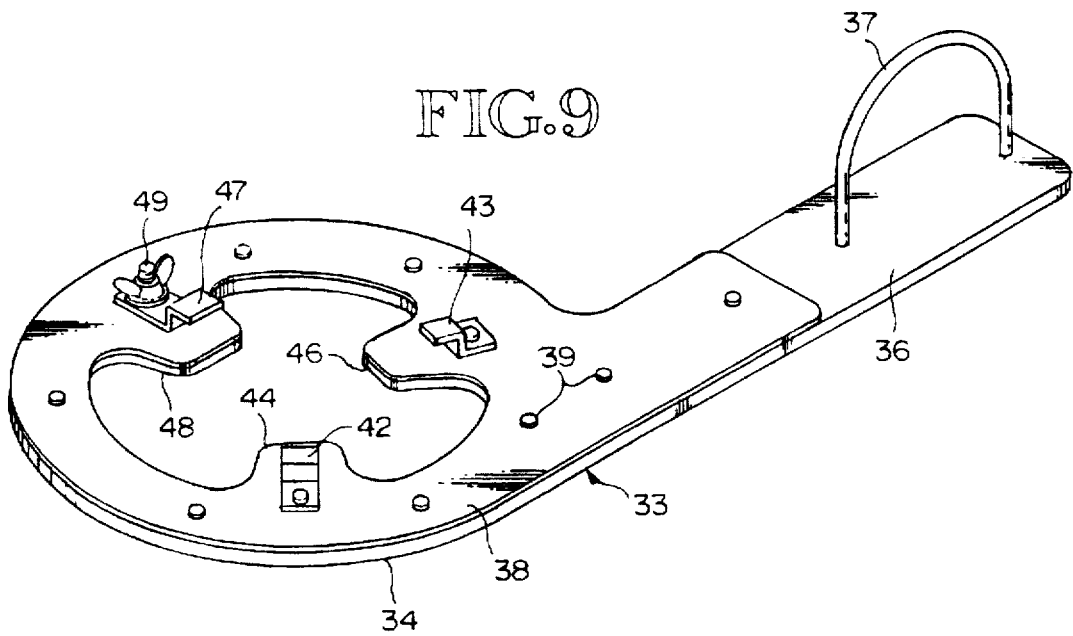
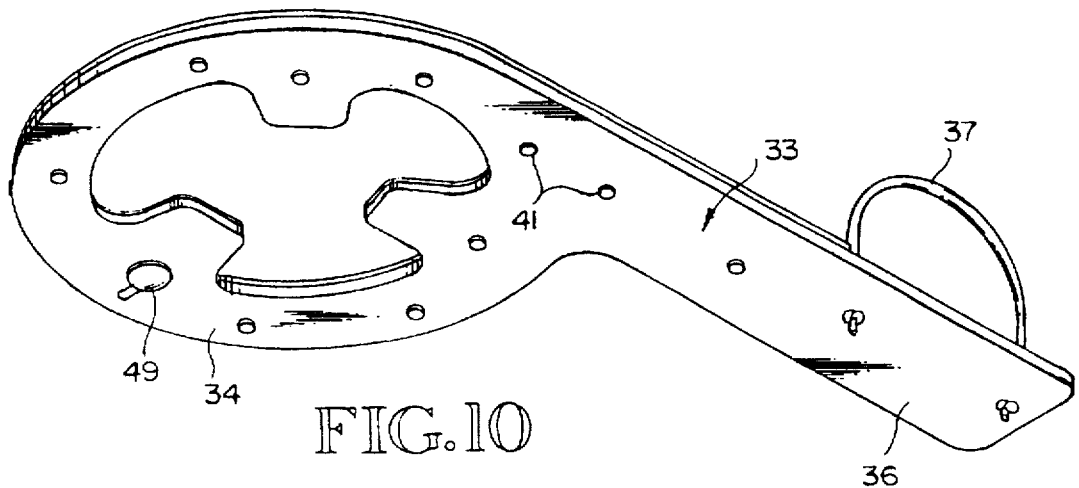

BACKPACK STOVE STAND

BACKGROUND OF THE INVENTION

1. Field of the Invention

The present invention relates to stands or pads for portable camping stoves and more particularly to an improved stand or pad providing a stable base for small lightweight camping stoves. The stand provides improved performance under conditions of limited and unstable supporting subsurfaces and especially those experienced by mountaineers and backpackers in high altitude terrain conditions of ice and snow. The stand supports a stove and fuel tank combination and is extremely lightweight and rugged enough to be conveniently carried inside or strapped to the outside of a backpack.

2. Description of the Prior Art

Camping stoves of the type under consideration are usually designed to burn kerosene, white gasoline or other liquid fuels and are small enough and lightweight enough to be carried in a backpack. The stoves are commonly used by hikers, campers mountaineers and other backpackers for convenience cooking or under conditions where firewood is unavailable. Often, and typically in mountainous areas, camping space is confined and flat areas are at a premium. Other conditions such as ice, snow or unstable sandy surfaces present problems of adequate support and stability. Under conditions of snow, high winds and sub-zero temperatures such as encountered by mountaineers, unless the stove is adequately supported, it becomes useless. Although the present stand has special features for use in ice and snow, it is also of special utility on sandy surfaces. Since the stove usually has either wire legs or a small "foot print", the soft or shifting sandy surface provides insufficient support to maintain stability.

Although there are several designs available, examples of typical camping stoves of the type discussed may be seen in U.S. Pat. Nos. 3,877,458 and 4,177,790. Portable backpacking stoves marketed under the names Whisperlite®, Whisperlite International® and Rapid Fire® by the MSR Company, Seattle, Wash., are all examples of well known commercially available stoves.

One known prior art stove pad device which attempts to address the problems discussed is found in U.S. Pat. No. 5,307,798 to Overmars Sr. The stove pad of the patent, however, relies on a lightweight steel or aluminum alloy rod or wire frame which, although compact and lightweight, does not provide the desired degree of stability. In conditions of ice and snow especially, the wire frame is subject to heating and melting the frozen base and, with the added weight of a cooking pot for instance, either sinking in or losing its level displacement with undesirable results. The wire frame with its "spider-like" central wire cross members does not provide adequate stability except under the most favorable hard-surface conditions. The present invention improves on this concept by providing a generally flat planar gripping base surface. A larger "foot print" is provided for greater stability in all cases and special provision is made for heat dissipation and insulation to prevent melting of the frozen supporting subsurface. The performance of the stand has been proven under the roughest terrain and weather conditions at extremely high altitudes. The stove stand of the present invention preserves the compact and lightweight features which adapt it to backpacking, however, because of its flat planar configuration and construction from lightweight materials, the overall weight of the typical stand is approximately 4.3 oz., well within the weight and bulk considerations for mountaineering backpacking.

SUMMARY OF THE INVENTION

The stove stand of the present invention comprises a base plate constructed from a thin sheet of polycarbonate resin provided with a mounting section on one end for removably attaching the portable stove and a mounting section on the opposite end for removably attaching the stove fuel tank. The central portion of the stove mounting section of the base plate is removed, both for weight reduction purposes and for escape of heat from the stove when in operation. The fuel tank mounting section of the base plate may also have its central section removed for weight reduction. Means such as bungee cords or the like are provided for temporarily holding the tank to the base plate adjacent the stove. In one embodiment, the base plate may be generally rectangular with the stove mounting end being rounded and the removal of the base plate material under the stove resulting in two longitudinal arms providing an attachment surface for the stove anchoring clips. This configuration is compatible with stove and tank combinations utilizing flexible fuel hoses. A second embodiment, designed for stove and tank combinations utilizing a rigid connector pipe, eliminates one of the base plate arms and utilizes a full circle stove mounting section with a single fuel tank mounting arm on the opposite end of the base plate.

Regardless of the configuration of the polycarbonate base plate, a thin sheet of aluminum, such as aircraft grade anodized aluminum, is attached to the top surface of the base plate surrounding the stove area and acts as a heat shield for the polycarbonate base plate. The thin aluminum heat shield on the top face of the base plate surrounds the stove and serves not only to shield the polycarbonate base but dissipates the heat which is generated by the stove. The polycarbonate base plate remains substantially unaffected by the heat thereby avoiding any tendency to melt the subsurface ice or snow. The heat shield is attached to the top surface of the base plate by such means as pop rivets or the like which extend through the bottom surface and form a plurality of cleats which serve to prevent the base plate from sliding on an ice or crusted snow surface. The number and placing of the pop rivets or other fasteners may be chosen for the most effective nonskid results. The stove leg or stove base anchor clips, which will normally be three in number, are mounted on the curved end of the stand and one of the clips will be provided with a slotted connection to the base plate and heat shield. Such means as a screw threaded clamp or wing nut may be utilized to engage and clamp the stove base or legs in place.

With this structure, a stable base for use on snow, ice and other unstable terrain is provided which holds both the stove and the fuel bottle for safer operation. The use of aircraft grade anodized aluminum and high impact polycarbonate resin provides for a lifetime of use with the base being thin and rugged enough to fit inside or to be strapped to the outside of a backpack. The use of thermoplastic polycarbonate resin prevents the base from becoming brittle even during use in sub-zero temperatures. The increased flat planar surface contact area provides greater stability than wire or rod type bases with the heat dissipation and insulation features eliminating and possibility of melting the frozen subsurface support.

BRIEF DESCRIPTION OF THE DRAWINGS

FIG. 3 is a right side elevation of the stand;

FIG. 4 is a top plan view of the stand;

FIG. 5 is a bottom plan view of the stand;

FIG. 9 is a frontal top perspective of a second embodiment of the stove stand; and FIG. 10 is a frontal bottom perspective of the second embodiment of the stove stand.

DETAILED DESCRIPTION OF THE PREFERRED EMBODIMENTS

Figure 1:
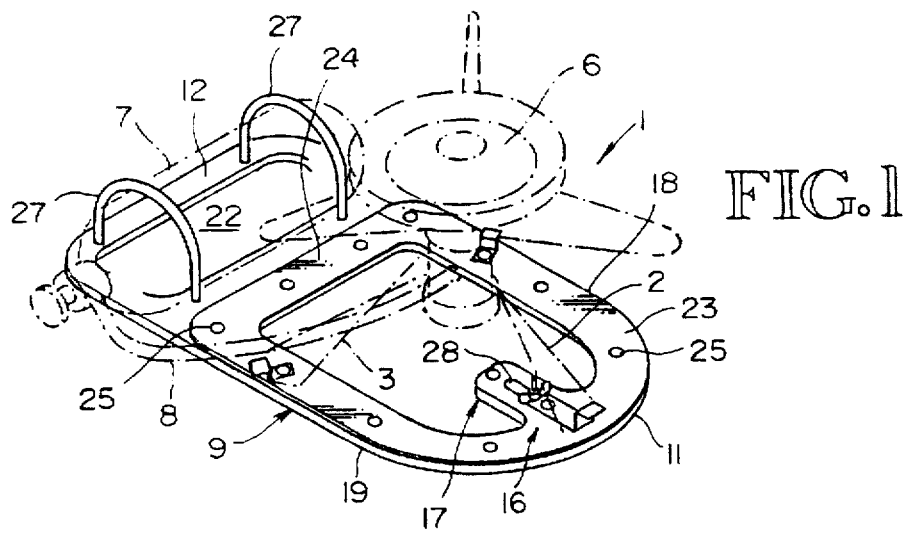
FIG. 1 is a perspective view of the stand with the fuel tank and stove shown in phantom.
Figure 2:
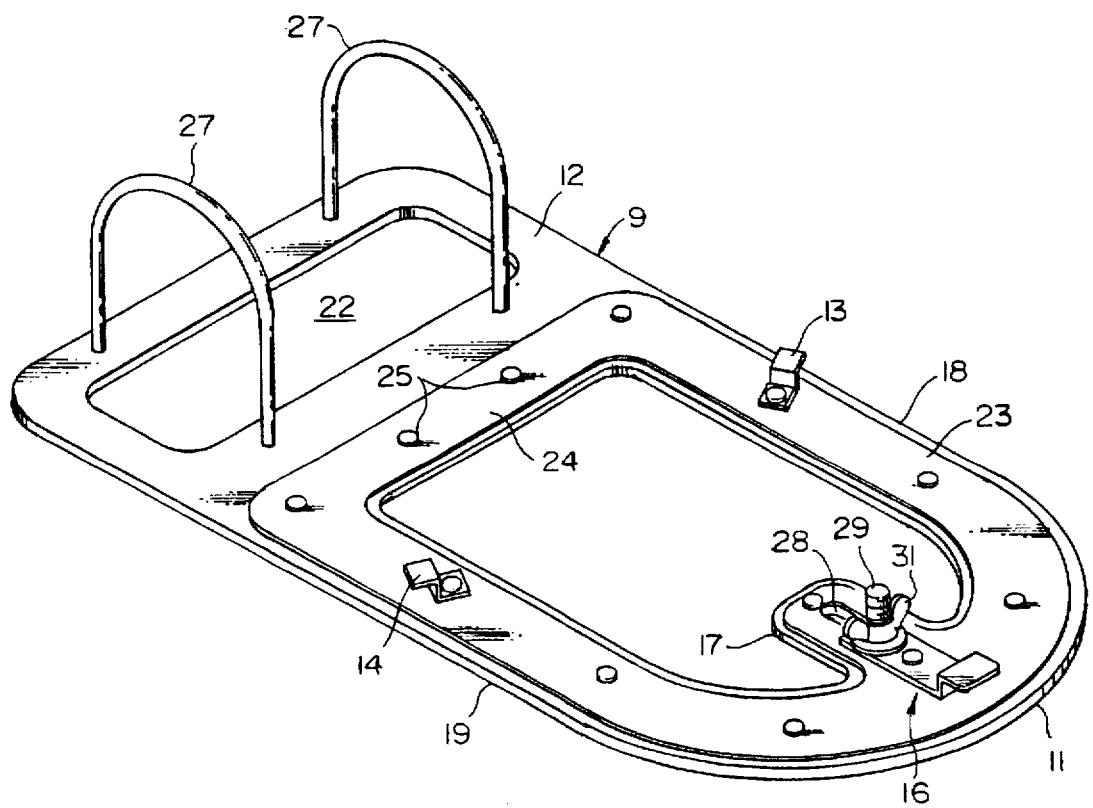
FIG. 2 is an enlarged perspective view of the stand alone.
Figure 6:
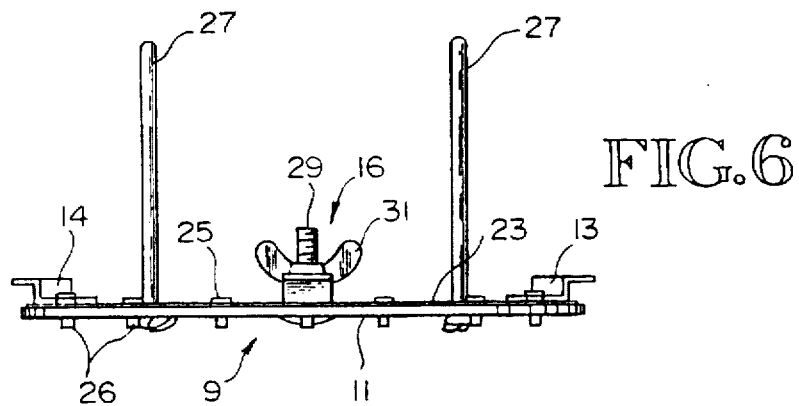
FIG. 6 is a front elevational view of the stand.
Figure 7:
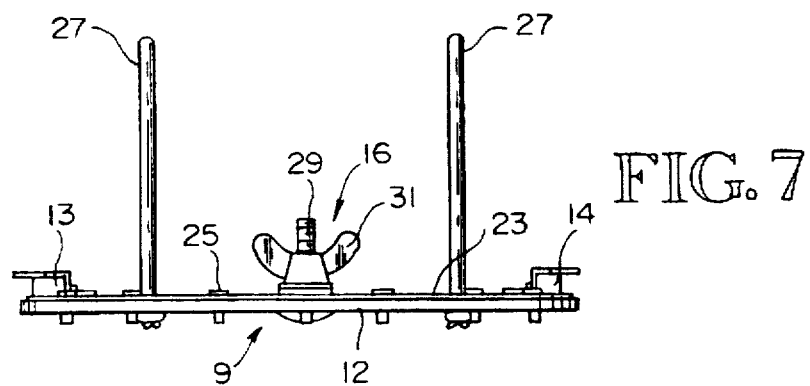
FIG. 7 is a rear elevational view of the stand.
Figure 8:
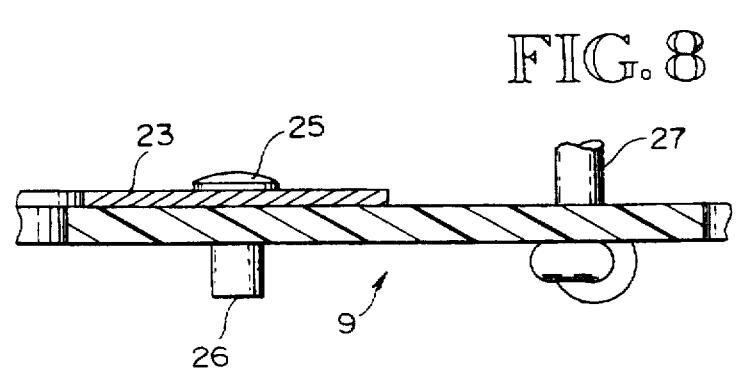
FIG. 8 is a cross sectional view taken along lines 8—8 of FIG. 4.

Referring to the drawings, FIG. 1 illustrates the stove stand embodiment with a camping stove and fuel tank shown in phantom. The stove 1 is of a well known design which utilizes three wire loop legs, two of which are shown at 2 and 3, and a burner section 6. The stove is connected to a fuel tank 7 by means of a flexible fuel line 8 in a well known manner. The stove stand comprises a base plate indicated generally at 9 which underlies and supports both the stove 1 and fuel tank 7. The base plate 9 is made of a high impact plastic preferably a polycarbonate resin sheet material which may have a thickness of approximately 0.125 inches so as to be semi rigid yet flexible enough to bend to accommodate the stress of use and normal storage in a backpack or otherwise. One example of a suitable polycarbonate resin is marketed by ATOHAAS North America, Inc., Philadelphia Pa. under the trademark TUFFAK®. The base plate provides a continuous planar surface in the shape of rounded stove support end 11 and a substantially rectangular area 12 on the opposite end for supporting the fuel tank. The rounded end area 11 provides a base for mounting the stove leg anchor clips 13 and 14 which are fixed to the base plate and designed to engage two of the stove legs as viewed in FIG. 1. The third leg of the stove is engaged by an adjustable anchor clip assembly 16, presently to be described, which is designed to exert a pulling force on the third leg 2 of the stove to hold the other two legs snugly in engagement with their fixed anchor clips.

As shown in the drawings, the adjustable anchor clip assembly 16 may be mounted on an inwardly directed extension 17 of the base plate. In order to reduce the overall weight of the stove base plate, the center portion is removed forming the two parallel side legs 18 and 19 and the curved front end 21 to form a continuous horse shoe shaped base configuration. The rectangular tank support end 12 of the base plate may also have its central section removed as at 22 for further weight reduction. The essential consideration, of course, being the removal of the maximum amount of material while still maintaining sufficient subsurface contact area for the desired stability and maintaining the structural integrity of the overall base plate.

A continuous heat shield 23 is located on the upper surface of the base plate and, in the present embodiment, completely overlies the horseshoe shaped stove supporting end of the base plate including a cross arm 24 joining the legs of the horse shoe shape. The heat shield is preferably constructed from aircraft grade anodized aluminum sheeting which may have a thickness of approximately 0.032 inches. Although the heat shield may be secured to the upper face of the base plate by any number of well known fastener means, the illustrated embodiment utilizes a plurality of pop rivets or equivalent 25 which hold the two layers together and provide protruding ends 26 which act as anti-skid cleats.

The cleats are located over a substantial arc of the bottom face of the base plate and provide a gripping surface on ice or snow. The number and placement of the rivets or fasteners 24 is a matter of choice with the amount of anti-skid action and overall weight being the primary considerations.

The rectangular end 12 of the base plate remote from the stove 1 need not be provided with the heat shield since its primary utility is that of supporting the fuel tank 7. A pair of elastic bungee cords 27 or any equivalent lightweight attaching means may be connected to the base plate in any manner desired for the purpose of holding the fuel tank in position when the stove is in use. The stove, which is usually foldable for storing, and the fuel tank may be carried separately in the backpack or conceivably held in place on the base plate if space is not a consideration.

As aforementioned, the fixed anchor clips 13 and 14 may be simple s-shaped bracket type hold downs connected to the heat shield and base plate by the same riveting method used to attach the heat shield to the base plate. The clips 13 and 14 may be conveniently be made of the same or heavier gauge anodized aluminum material used for the heat shield. These two clips will normally be in a fixed position on the side legs of the base plate. As illustrated, the inwardly directed extension 17 on the curved end 11 of the base plate is provided with an elongated slot 28 which slidably receives the screw threaded fastener 29. The fastener 29 may be a bolt with a clamping nut such as the wing nut 31 which serves to clamp the adjustable anchor clip 16 in position along the slot 28. If desired, a guide pin 32 may be carried by the clip 16 and extend into the slot 28 to be guided thereby. In this manner, when the anchor clip 16 is pulled tightly against the forward stove leg loop 2, the other two legs are pulled tightly into the fixed anchor clips 13 and 14 and the wing nut 31 is tightened to hold the stove securely in place. To assemble the stove and stand, the stove fuel line 8 is first connected to the fuel tank and pump assembly 7. The fuel tank or bottle is slid under the elastic bungee cords 27, the stove legs are moved to the support position shown and engaged in the clips 13 and 14. The third stove leg is engaged in the adjustable clip 16 and the clip is moved against the stove leg such that all three legs are anchored. The wing nut is then tightened to secure the anchor clip in place. The stove is connected to the fuel line in a well known manner and the assembly is ready for use.

A second embodiment of the stove stand is shown in FIGS. 9 and 10 and is configured for the mounting of a pump and tank assembly which has a rigid fuel pipe connected to the camp stove which, in this embodiment, has circular support base. The base plate 33 as shown in FIGS. 9 and 10 will be understood to be constructed from the same polycarbonate resin material described for the previous embodiment. The base plate 33 will include a circular stove mounting section 34 and an extended tank mounting arm 36, in this case extending tangentially from the circular end portion. The single arm 36 is sufficient in this embodiment because the rigid fuel pipe is connected to both the stove and the tank requiring no further support. The tank may be mounted on the base plate arm 36 by means of an elastic bungee strap 37 or the like as described for the previous embodiment. An anodized aluminum heat shield 38 is mounted on the upper surface of the circular end section 34 of the base plate and extends a given distance along the arm 36 as illustrated. The extended portion of the heat shield 38 which is connected by rivets to the arm 36 also serves to provide added rigidity to the base plate. The heat shield 38 may be attached to the base plate 33 by pop rivets or the equivalent 39 as described for the previous embodiment. In the same manner previously described, the rivets or other fasteners provide a plurality of spaced anti-skid cleats 41 protruding from the bottom surface of the base plate. Since the base of the stove in this embodiment is circular in configuration, it may be held to the base plate by means of the two fixed anchor clips 42 and 43 attached to the base plate an heat shield on the inwardly directed base plate extensions 44 and 46 as illustrated. In a like manner, the adjustable anchor clip 47 is mounted on an inwardly directed base plate extension 48. The adjustable clip 47 may be mounted for sliding adjustment and clamped to the base plate by means of a screw threaded clamp arrangement 49 which may be identical to the screw threaded fastener 29 of the previous embodiment. With this arrangement, the central portion of the circular base plate is removed for heat dissipation and the heat shield 38 performs in substantially the same manner as described for the previous embodiment.

Although preferred embodiments of the invention have been shown and described herein with certain specific modifications, it is understood that the present disclosure is made by way of example and that various other embodiments and modifications are possible without departing from the inventive concept and are included within the scope of the following claims, which claimed subject matter is regarded as the invention. The aim of the appended claims therefor is to cover all such changes and modifications as fall within the true spirit and scope of the invention.

What is claimed is:

1. A stove stand for a portable stove and fuel tank combination comprising;
   an elongated relatively thin sheet material base plate with planar top and bottom surfaces for mounting a stove and fuel tank and for substantially full surface contact with a supporting sub surface respectively,
   said base plate including a stove mounting section on one end and a tank mounting section on the other end thereof,
   anchor clip members located on said stove mounting section positioned to receive and clamp a stove base on the top surface thereof,
   said stove mounting section having a cut-out area directly beneath the stove to permit the flow of heat from the stove directly to the-supporting sub surface, and
   hold-down means on said tank mounting section for removably mounting a fuel tank to the top surface thereof.

2. A stove stand for a portable stove and fuel tank combination comprising;
   an elongated relatively thin sheet metal base plate with planar top and bottom surfaces for mounting a stove and fuel tank and for contacting a supporting sub surface respectively,
   said base plate being generally rectangular in plan and including a stove mounting section on one end and a tank mounting section on the other end thereof,
   said stove mounting section having a cut-out area directly beneath the stove forming two spaced apart longitudinally extending arms and a connector arm therebetween at the distal end of the base plate to completely surround the stove base,
   a stationary anchor clip located on each said arms,
   an adjustable anchor clip located on said connector arm for forcing the stove base against said stationary clips to provide a three point anchor for the stove, and
   hold-down means on said tank mounting section for removably mounting a fuel tank to the top surface thereof.

3. The stove stand of claim 2 where said base plate is composed of thermoplastic polycarbonate resin.

4. A stove stand for a portable stove and fuel tank combination comprising;
   an elongated relatively thin sheet material base plate with planar top and bottom surfaces for mounting a stove and fuel tank and for contacting a supporting sub surface respectively,
   said base plate including a stove mounting section on one end and a tank mounting section on the other end thereof,
   said stove mounting section being generally circular in plan with a cut-out area located in the center thereof directly beneath the stove,
   at least three anchor clips located on said stove mounting section spaced equidistantly about said cut-out area and positioned to receive and clamp a stove base on the top surface thereof, one said clips being adjustable for forcing the stove base against the remaining clips providing a three point anchor for the stove,
   said tank mounting section comprising a mounting arm extending from said stove mounting section, and
   hold down means on said mounting arm for removably mounting a fuel tank to the top surface thereof.

5. The stove stand of claim 4 wherein said base plate is composed of thermoplastic polycarbonate resin.

6. A stove stand comprising, in combination;
   a thin non-metallic sheet material base plate,
   a thin sheet metal heat shield mounted on said base plate, and
   anchor clip members for mounting a stove above said heat shield,
   said base plate having a cut-out area directly beneath the stove.

7. A stove stand for a portable stove comprising;
   a thin non-metallic sheet material base plate with planar top and bottom surfaces for mounting a stove and for contacting a supporting sub surface respectively,
   a thin sheet metal heat shield mounted on said top surface and extending over a substantial area thereof, and
   anchor clip members located on said heat shield and said base plate positioned to receive and clamp a stove base,
   said base plate having a cut-out area directly beneath the stove and said heat shield substantially surrounding said cut-out area,
   whereby said heat shield dissipates stove heat, said base plate insulates the heat shield from the supporting sub surface and the bottom surface of the base plate provides a stable support area, said cut-out area permitting the flow of heat from the stove directly to the supporting sub surface.

8. The stove stand of claim 7 wherein said base plate includes a fuel tank mounting section on one end thereof remote from said cut-out area, and
   hold-down means on said fuel tank section for removably mounting a horizontally disposed fuel tank thereon.

9. The stove stand of claim 8 including;
   a plurality of spaced cleat members protruding from the bottom surface of said base plates for gripping the supporting sub surface.

10. The stove stand of claim 9 wherein said base plate is composed of high impact thermoplastic polycarbonate resin.

11. The stove stand of claim 10 wherein said heat shield is composed of anodized aluminum.

12. The stove stand of claim 11 wherein said anchor clip members comprise two spaced fixed anchor clips and an adjustable anchor clip, said adjustable anchor clip being disposed for forcing the stove base against said fixed clips to provide a three point anchor for the stove.

13. The stove stand of claim 7 wherein;

said base plate is generally rectangular in plan with said cut-out area forming two spaced apart longitudinally extending arms and a connector arm therebetween at the distal end of the base plate to completely surround the stove base.

14. The stove stand of claim 7 wherein;

said base plate includes a stove mounting section and a tank mounting section, said stove mounting section is generally circular in plan with said cut-out area being located in the center thereof, at least three anchor clips spaced equidistantly about said cut-out area, one clip being adjustable for forcing the stove base against the remaining clips providing a three point anchor for the stove, said tank mounting section comprising a mounting arm extending from said stove mounting section, and hold-down means on said arm for removably mounting a fuel tank to the top surface thereof.

15. The stove stand of claim 14 wherein said base plate is composed of high impact thermoplastic polycarbonate resin.

16. The stove stand of claim 15 wherein said heat shield is composed of anodized aluminum.

17. The stove stand of claim 16 including;

a plurality of spaced cleat members protruding from the bottom surface of said base plate for gripping the supporting sub surface.

18. In a portable backback stove stand, the combination comprising;

a substantially planar sheet material base plate for contacting a supporting sub surface, a heat shield mounted on said base plate for dissipating stove heat, and anchor clips for mounting a stove spaced above said heat shield, said heat shield including a portion thereof extending about the perimeter area of the bottom of said stove, whereby said base plate is prevented from transmitting stove heat to the sub surface therebeneath.

19. The stove stand of claim 18 wherein said base plate includes a cut-out area directly beneath the stove to permit the flow of heat from the bottom of the stove directly to the supporting sub surface.

* * * * *